(12) United States Patent
Kokubun et al.

(10) Patent No.: US 7,679,343 B2
(45) Date of Patent: Mar. 16, 2010

(54) POWER SUPPLY SYSTEM AND METHOD FOR CONTROLLING OUTPUT VOLTAGE

(75) Inventors: Masatoshi Kokubun, Kasugai (JP); Takashi Matsumoto, Kasugai (KR)

(73) Assignee: Fujitsu Microelectronics Limited, Yokohama (JP)

( * ) Notice: Subject to any disclaimer, the term of this patent is extended or adjusted under 35 U.S.C. 154(b) by 64 days.

(21) Appl. No.: 11/898,575

(22) Filed: Sep. 13, 2007

(65) Prior Publication Data

US 2008/0068871 A1     Mar. 20, 2008

(30) Foreign Application Priority Data

Sep. 15, 2006   (JP)   .............................. 2006-251584

(51) Int. Cl.
*G05F 1/40* (2006.01)
*H02J 7/00* (2006.01)

(52) U.S. Cl. ...................... 323/268; 320/128

(58) Field of Classification Search ................... 363/84, 363/89, 125, 127; 323/268, 271, 282, 285; 320/128, 135, 140, 141; 307/46, 48, 52, 307/64, 66, 72–75
See application file for complete search history.

(56) References Cited

U.S. PATENT DOCUMENTS

| | | | | |
|---|---|---|---|---|
| 5,818,203 A * | 10/1998 | Narita | .................. | 320/128 |
| 6,201,371 B1 * | 3/2001 | Kawabe et al. | .............. | 320/121 |
| 6,617,826 B2 * | 9/2003 | Liao et al. | .................... | 320/118 |
| 7,486,046 B2 * | 2/2009 | Chou | .......................... | 320/107 |

FOREIGN PATENT DOCUMENTS

JP          3428955 B2       5/2003

* cited by examiner

*Primary Examiner*—Matthew V Nguyen
(74) *Attorney, Agent, or Firm*—Arent Fox LLP

(57) ABSTRACT

A power supply system including an external power supply unit generating direct-current output voltage and an electronic device connected to the external power supply unit and operable on the output voltage of the external power supply unit. The external power supply unit includes a voltage control circuit receiving control current and controlling the output voltage of the external power supply unit in accordance with the control current. The voltage control circuit controls the output voltage of the external power supply unit to be equal to the minimum voltage possible for the external power supply unit to generate when the control current is minimum.

16 Claims, 8 Drawing Sheets

POWER SUPPLY SYSTEM AND METHOD FOR CONTROLLING OUTPUT VOLTAGE

CROSS-REFERENCE TO RELATED APPLICATIONS

This application is based upon and claims the benefit of priority from prior Japanese Patent Application No. 2006-251584, filed on Sep. 15, 2006, the entire contents of which are incorporated herein by reference.

BACKGROUND

A typical portable electronic device, such as a notebook personal computer, is operated by a battery attached to the device and by an external power supply unit such as an AC adapter. The battery used for the portable electronic device is charged with a charging current supplied from the external power supply unit connected to the device. A large inrush current may flow through the battery when the external power supply unit is connected to the device or when the battery is attached to the device. The electronic device is required to prevent such an inrush current from flowing through the battery.

Some portable electronic devices conventionally use rechargeable batteries as their drive power supplies. Such a conventional electronic device to which a rechargeable battery is attached includes a charging circuit for generating charging current that charges the rechargeable battery with an external power supply unit (refer, for example, to Japanese Patent No. 3428955).

A charging circuit 11 arranged in a conventional electronic device will now be described with reference to FIG. 1.

The charging circuit 11 receives direct-current adapter voltage VAC from an AC adapter 12 connected to the electronic device. The charging circuit 11, which is a DC/DC converter, converts the adapter voltage VAC into output voltage Vout. Error amplifiers 13 to 16 generate a control current Isc in accordance with an output current Iout flowing through a resistor R1, a charging current Ichg flowing through a resistor R2 connected to a battery BT, and a terminal voltage of the battery BT. A pulse width modulator (PWM) 17 changes the duty cycle for activating and inactivating metal oxide semiconductor (MOS) transistors T1 and T2 in accordance with the control Isc. The charging circuit 11 supplies output power, in accordance with the duty cycle, to a system circuit 19 via a system DC/DC converter 18. At the same time, the charging circuit 11 charges the battery BT.

SUMMARY

It is an aspect of the embodiments discussed herein to provide a supply system having an external power supply unit generating direct-current output voltage and an electronic device coupled to the external power supply unit and operable on the output voltage of the external power supply unit the external power supply unit including a voltage control circuit receiving control current and controlling the output voltage of the external power supply unit in accordance with the control current the electronic device having a rechargeable battery for generating battery voltage a system circuit that operates on system voltage generated from at least either one of the output voltage of the external power supply unit and the battery voltage of the rechargeable battery and a detection circuit detecting the difference between a detection subject, which includes at least one of the battery voltage of the rechargeable battery, an output current of the external power supply unit, and a charging current charging the rechargeable battery, and a reference signal, which is in accordance with the detection subject, and generating the control current in accordance with the detected difference; and wherein the voltage control circuit controls the output voltage of the external power supply unit to be equal to the minimum voltage possible for the external power supply unit to generate when the control current is minimum.

DETAILED DESCRIPTION OF THE PREFERRED EMBODIMENTS

One embodiment will now be described with reference to FIGS. 4 to 7.

Figure 4:
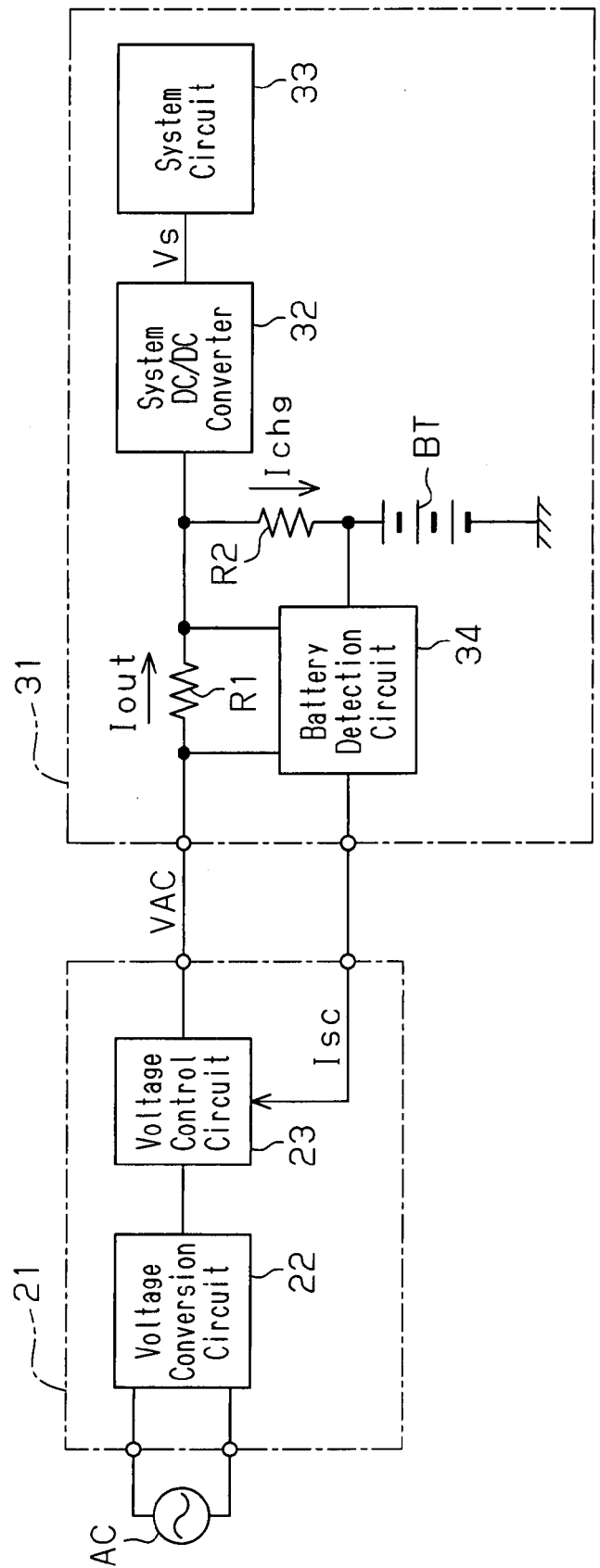
FIG. 4 is a schematic block diagram of a power supply system according to one embodiment.

FIG. 4 schematically describes the structure of a power supply system in accordance with the one embodiment. The power supply system includes an AC adapter 21, which functions as an external power supply unit, and an electronic device 31 connected to the AC adapter 21. The AC adapter 21 is connectable to an alternating-current power supply AC. The AC adapter 21 includes a voltage conversion circuit 22 that receives commercial alternating-current voltage from an alternating-current power supply AC. The voltage conversion circuit 22 converts the alternating-current voltage to a direct-current voltage and outputs the direct-current voltage. A voltage control circuit 23 receives a control current Isc and generates an adapter voltage VAC, which is controlled based on the direct-current voltage in accordance with the control current Isc. The adapter voltage VAC is supplied to the electronic device 31.

The adapter voltage VAC is supplied to a system DC/DC converter 32 via a resistor R1. A battery BT, such as a rechargeable battery, is connected to the system DC/DC converter 32 via a resistor R2. The system DC/DC converter 32 converts its input voltage to generate a system voltage Vs in accordance with the adapter voltage VAC and a battery voltage supplied from the battery BT. Then, the system DC/DC converter 32 supplies the system voltage Vs to a system circuit 33. As a result, the system circuit 33 is supplied with power from either the AC adapter 21 or the battery BT. The system circuit 33 realizes various functions of the electronic device 31.

The resistor R1 and the resistor R2 are connected to a battery detection circuit 34. The battery detection circuit 34 is connected to the two terminals of the resistor R1 and to a node between the resistor R2 and the battery BT. The battery detection circuit 34 detects current Iout flowing through the resistor R1 based on the potential difference between the two terminals of the resistor R1. The battery detection circuit 34 also detects charging current Ichg flowing through the resistor R2 based on a potential difference between the two terminals of the resistor R2. The battery detection circuit 34 further detects the voltage supplied to the system DC/DC converter 32 (or the adapter voltage VAC) and the terminal voltage of the battery BT. The battery detection circuit 34 generates the control current Isc in accordance with the detected current and voltage. Then, the battery detection circuit 34 supplies the control current Isc to the voltage control circuit 23 of the AC adapter 21. The voltage control circuit 23 of the AC adapter 21 controls the adapter voltage VAC in accordance with the control current Isc supplied from the battery detection circuit 34.

Figure 5:
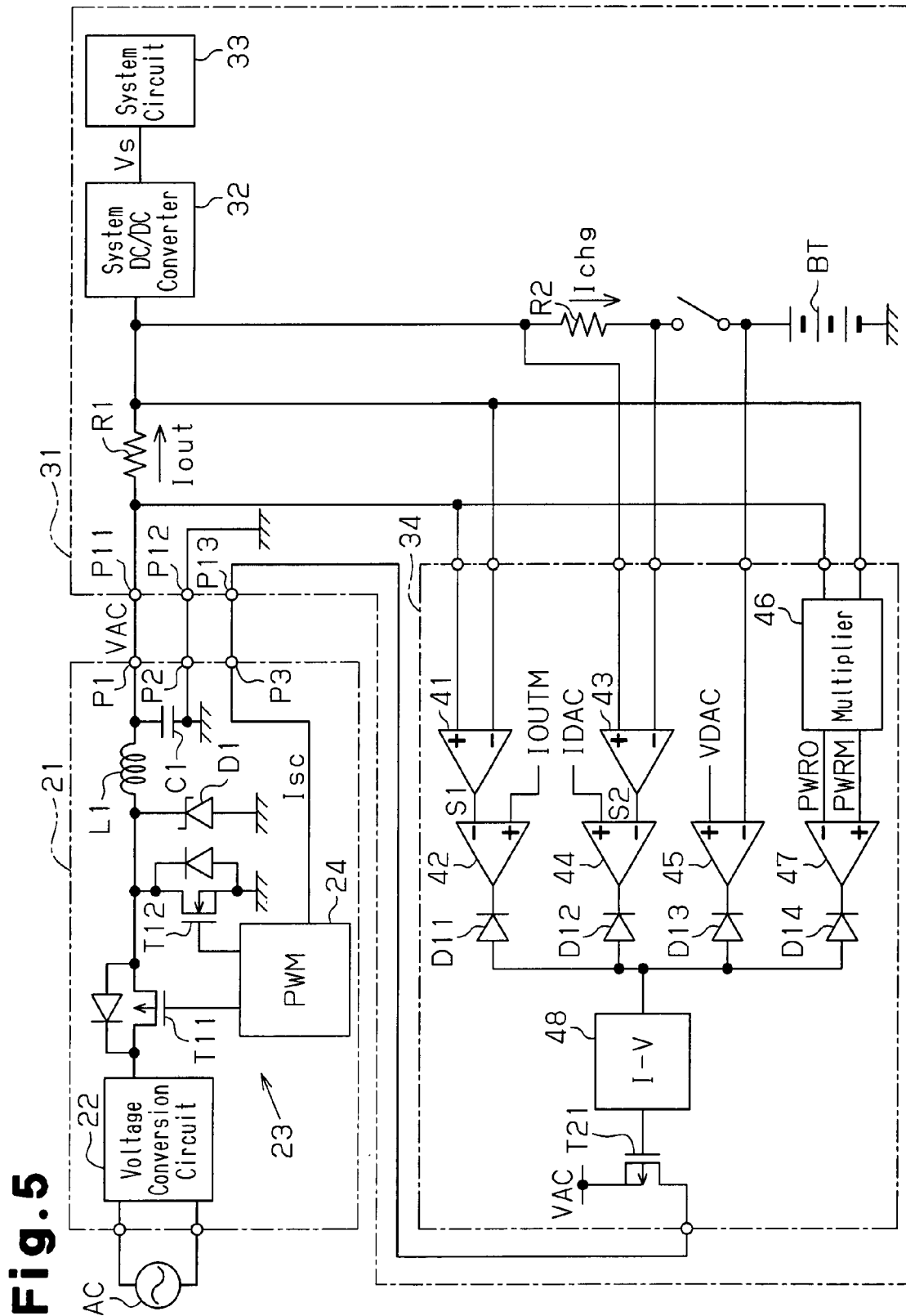
FIG. 5 is a detailed block diagram of the power supply system of FIG. 4.

One example of the structure of the AC adapter 21 will now be described. Referring to FIG. 5, the voltage conversion circuit 22 is connected to a first terminal (e.g., source) of a first transistor T11. A second terminal (e.g., drain) of the first transistor T11 is connected to a first terminal of a choke coil L1. A second terminal of the choke coil L1 is connected to a first terminal of the AC adapter 21, that is, an output terminal P1.

The second terminal of the first transistor T11 is also connected to a first terminal (e.g., a drain) of a second transistor T12. A second terminal (e.g., a source) of the second transistor T12 is connected to ground. A control terminal (gate) of the first transistor T11 and a control terminal (gate) of the second transistor T12 are connected to a pulse width modulator (PWM) 24.

In this embodiment, the first transistor T11 is a P-channel MOS transistor, and the second transistor T12 is an N-channel MOS transistor. A body diode is shown in the drawing for each of the transistors T11 and T12.

The first terminal of the choke coil L1 is connected to a cathode of a diode D1. An anode of the diode D1 is connected to ground. The output terminal P1 of the AC adapter 21 is connected to a first terminal of a smoothing capacitor C1. A second terminal of the capacitor C1 is connected to ground. A second terminal of the AC adapter 21, that is, a ground terminal P2, is connected to ground. A third terminal of the AC adapter 21, that is, a control terminal P3, is connected to the PWM 24.

The PWM 24 receives the control current Isc via the control terminal P3 of the AC adapter 21. The PWM 24 controls the first transistor T11 and the second transistor T12 so that they are activated and inactivated in a complementary manner in predetermined duty cycles. The switching operation of the first transistor T11 smoothes the output current of the transistor T11 with the choke coil L1 and the capacitor C1. When the first transistor T11 is activated, the output voltage of the voltage conversion circuit 22 is supplied to an LC circuit (a smoothing circuit formed by the choke coil L1 and the capacitor C1) via the transistor T11. When the first transistor T11 is inactivated, a current passage is formed by the diode D1. When the first transistor T11 is activated, the energy accumulated in the choke coil L1 is discharged toward the output terminal P1 of the AC adapter 21.

Further, the PWM 24 varies the duty cycle in response to the control current Isc. In detail, the PWM 24 varies the duty cycle to change the period during which the first transistor T11 is activated in accordance with the current value of the control current Isc. The adapter voltage VAC output from the AC adapter 21 corresponds to the on period of the first transistor T11. When the on period of the first transistor T11 is long, the energy accumulated in the choke coil L1 increases, and the AC adapter 21 outputs a high adapter voltage VAC. When the on period of the first transistor T11 is short, the energy accumulated in the choke coil L1 decreases, and the AC adapter 21 outputs a low adapter voltage VAC.

Figure 6:
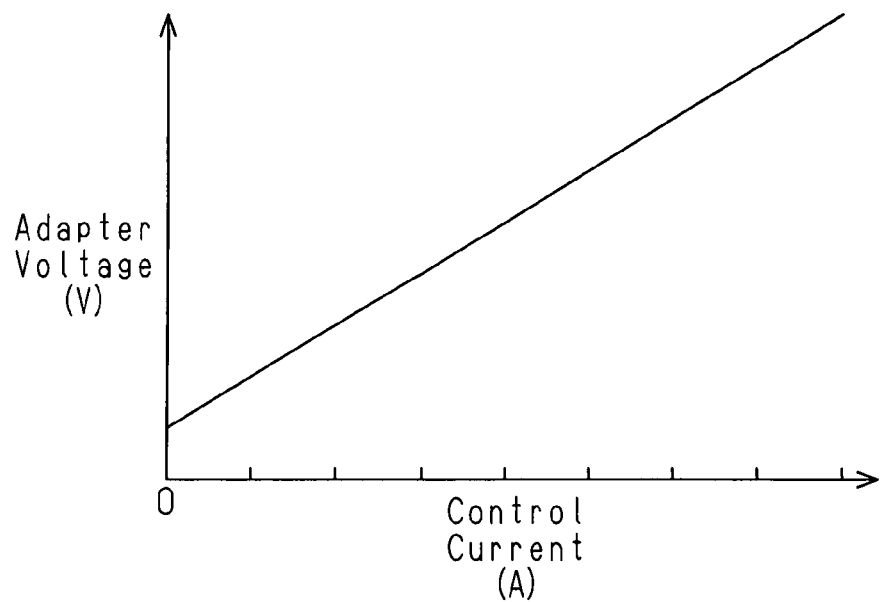
FIG. 6 is a graph showing the relationship between control current and adapter voltage in the power supply system of FIG. 5.
Figure 7:
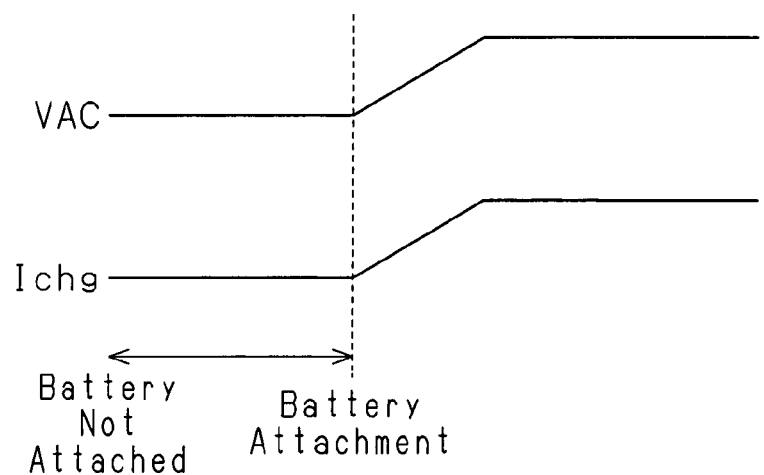
FIG. 7 is a waveform diagram showing an adapter voltage VAC and a charging current Ichg in the power supply system of FIG. 5.

Accordingly, the AC adapter 21 varies the adapter voltage VAC in accordance with the control current Isc as shown in FIG. 6. When the AC adapter 21 is not supplied with the control current Isc, the AC adapter 21 outputs a minimum adapter voltage VA. Thus, when the AC adapter 21, which is in a state connected to the alternating-current power supply AC, is connected to the electronic device 31, the control current Isc is zero. In this case, the minimum adapter voltage VAC is supplied to the electronic device 31. Thus, as shown in FIG. 7, a large inrush current is prevented from flowing to the battery BT that is attached to the electronic device 31.

The structure for generating the control current Isc, that is, the structure of the battery detection circuit 34 incorporated in the electronic device 31 will now be described.

The adapter voltage VAC generated by the AC adapter 21 is supplied to a first terminal P11 of the electronic device 31. As a result, current Iout flows through the resistor R1 of the electronic device 31. The two terminals of the resistor R1 are connected to input terminals of a current amplifier 41 of the battery detection circuit 34.

The current amplifier 41 detects the current Iout flowing through the resistor R1, that is, the output current of the AC adapter 21, and generates a detection signal S1 in accordance with the detection result and outputs the detection signal S1 to an error amplifier 42.

The error amplifier 42 has an inversion input terminal for receiving the detection signal S1 and a non-inversion input terminal for receiving a current reference signal IOUTM. The current reference signal IOUTM is set beforehand in accordance with the total amount of current used by the electronic device 31. The error amplifier 42 compares the detection signal S1 with the current reference signal IOUTM, to generate an error voltage that is in accordance with the comparison result.

A current amplifier 43 has input terminals connected to the two terminals of the resistor R2. The current amplifier 43 detects the charging current Ichg, which flows through the resistor R2 and charges the battery BT, and generates a detection signal S2 in accordance with the detected charging current Ichg. Then, the current amplifier 43 outputs the detection signal S2 to an error amplifier 44. The error amplifier 44 includes a non-inversion input terminal, which receives a limitation current signal IDAC having a voltage value determined in accordance with the charging current of the battery BT, and an inversion input terminal, which receives the detection signal S2. The error amplifier 44 generates an error voltage obtained by amplifying the difference between the voltage of the detection signal S2 and the voltage of the limitation current signal IDAC.

A node between the resistor R2 and the battery BT is connected to an inversion input terminal of an error amplifier 45. A voltage limitation signal VDAC is input to a non-inversion input terminal of the error amplifier 45. The error amplifier 45 generates an error voltage obtained by amplifying the difference between the terminal voltage of the battery BT and the voltage limitation signal VDAC.

The two terminals of the resistor R1 are connected to a multiplier 46. The multiplier 46 detects a terminal voltage of the resistor R1, that is, the adapter voltage VAC, and the total current amount based on the voltage across the resistor R1.

The multiplier 46 outputs a value obtained by multiplying the adapter voltage VAC and the total current amount, that is, a power detection signal PWRO determined in accordance with the total power amount to an error amplifier 47. The error amplifier 47 includes an inversion input terminal, which receives the power detection signal PWRO, and a non-inversion input terminal, which receives a power limitation signal PWRM. The error amplifier 47 generates an error voltage obtained by amplifying the difference between the power detection signal PWRO and the power limitation signal PWRM.

Cathodes of diodes D11, D12, D13, and D14 are connected to output terminals of the error amplifiers 42, 44, 45, and 47, respectively. Anodes of the diodes D11 to D14 are commonly connected to a current voltage conversion circuit 48. The diodes D11 to D14 transmit to the current voltage conversion circuit 48 the current (error current) that is dependent on the maximum one of the output voltages of the error amplifiers 42, 44, 45, and 47. The maximum output voltage is the detection value having the maximum error.

A transistor T21, which forms a constant current source, includes a control terminal (gate) connected to an output terminal of the current voltage conversion circuit 48. The current voltage conversion circuit 48 provides the gate of the transistor T21 with a signal indicating a voltage value proportional to a current amount. In this embodiment, the transistor T21 is a P-channel MOS transistor and has a source supplied with the adapter voltage VAC and a drain connected to a third terminal P13 of the electronic device 31. A second terminal P12 of the electronic device 31 is connected to ground.

The transistor T21 operates as a resistor having a resistance determined in accordance with a voltage signal provided to its gate. Further, the transistor T21 outputs a control current Isc determined in accordance with the resistance. The transistor T21 is a P-channel MOS transistor and thereby has a high resistance when its gate voltage is high and a low resistance when its gate voltage is low. Thus, when the voltage signal of the current voltage conversion circuit 48 indicates a high voltage, that is, when the detection result indicates a large error, the transistor T21 outputs a small control current Isc. When the voltage signal of the current voltage conversion circuit 48 indicates a low voltage, that is, when the detection result indicates a small error, the transistor T21 outputs a large control current Isc.

When the battery BT is not attached to the electronic device 31, the terminal voltage input to the error amplifier 45 is zero. The charging current detected by the error amplifier 44 is also zero. Thus, the error is large and the input current of the current voltage conversion circuit 48 is large. In this case, the transistor T21 outputs a small control current Isc so that the voltage control circuit 23 of the AC adapter 21 outputs a low adapter voltage VAC. When the battery BT is attached to the electronic device 31 in this state, the difference between the terminal voltage of the battery BT and the adapter voltage VAC supplied from the AC adapter 21 is small. This prevents inrush current from flowing to the battery BT.

When the operating power supply voltage of the power supply system decreases, such as when the electronic device 31 is inactivated, the battery detection circuit 34 lowers the control current Isc so that the AC adapter 21 generates a low adapter voltage VAC. Accordingly, the battery detection circuit 34 produces an operational power supply voltage margin and moderates the operation conditions. Further, the AC adapter 21 supplies a low adapter voltage VAC. Thus, the electronic device 31 suspends operations when operating on a low input voltage. This prevents the electronic device 31 from being supplied with a high adapter voltage VAC when the electronic device 31 is operating on a low voltage. Thus, the circuits of the electronic device 31 are not damaged by a high adapter voltage VAC.

This embodiment has the advantages described below.

(1) The AC adapter 21 varies the adapter voltage VAC in accordance with the control current Isc supplied from the electronic device 31. During a period in which the control current Isc is not supplied, the AC adapter 21 outputs the minimum adapter voltage VAC. With this structure, the control current Isc is zero when the electronic device 31 is connected to the AC adapter 21, which is in a state connected to the alternating-current power supply AC. The minimum adapter voltage VAC is supplied to the electronic device 31. As a result, a large inrush current is prevented from flowing to the battery BT attached to the electronic device 31.

(2) When the battery BT is not attached to the electronic device 31, the terminal voltage input to the error amplifier 45 is zero, and the charging current detected by the error amplifier 44 is also zero. In this case, the error is large and the input current supplied to the current voltage conversion circuit 48 is large. Thus, that a small control current Isc is output from the transistor T21. As a result, the voltage control circuit 23 of the AC adapter 21 outputs a low adapter voltage VAC. When the battery BT is attached to the electronic device 31 in this state, the difference between the terminal voltage of the battery BT and the adapter voltage VAC supplied from the AC adapter 21 is small. Thus, a large inrush current is prevented from flowing to the battery BT.

(3) When the operating power supply voltage of the power supply system decreases, such as when the electronic device 31 suspends operations, the battery detection circuit 34 lowers the control current Isc, and the AC adapter 21 generates a low adapter voltage VAC. As a result, the battery detection circuit 34 operates with an operational power supply voltage margin and moderates the operation conditions. Further, the AC adapter 21 supplies a low adapter voltage VAC, the electronic device 31 suspends operations when operating on a low input voltage. This prevents the electronic device 31 from being supplied with a high adapter voltage VAC when operating on a low voltage. Thus, the circuits of the electronic device 31 are not damaged by a high adapter voltage VAC.

This embodiment may be modified in the following forms.

Figure 8:
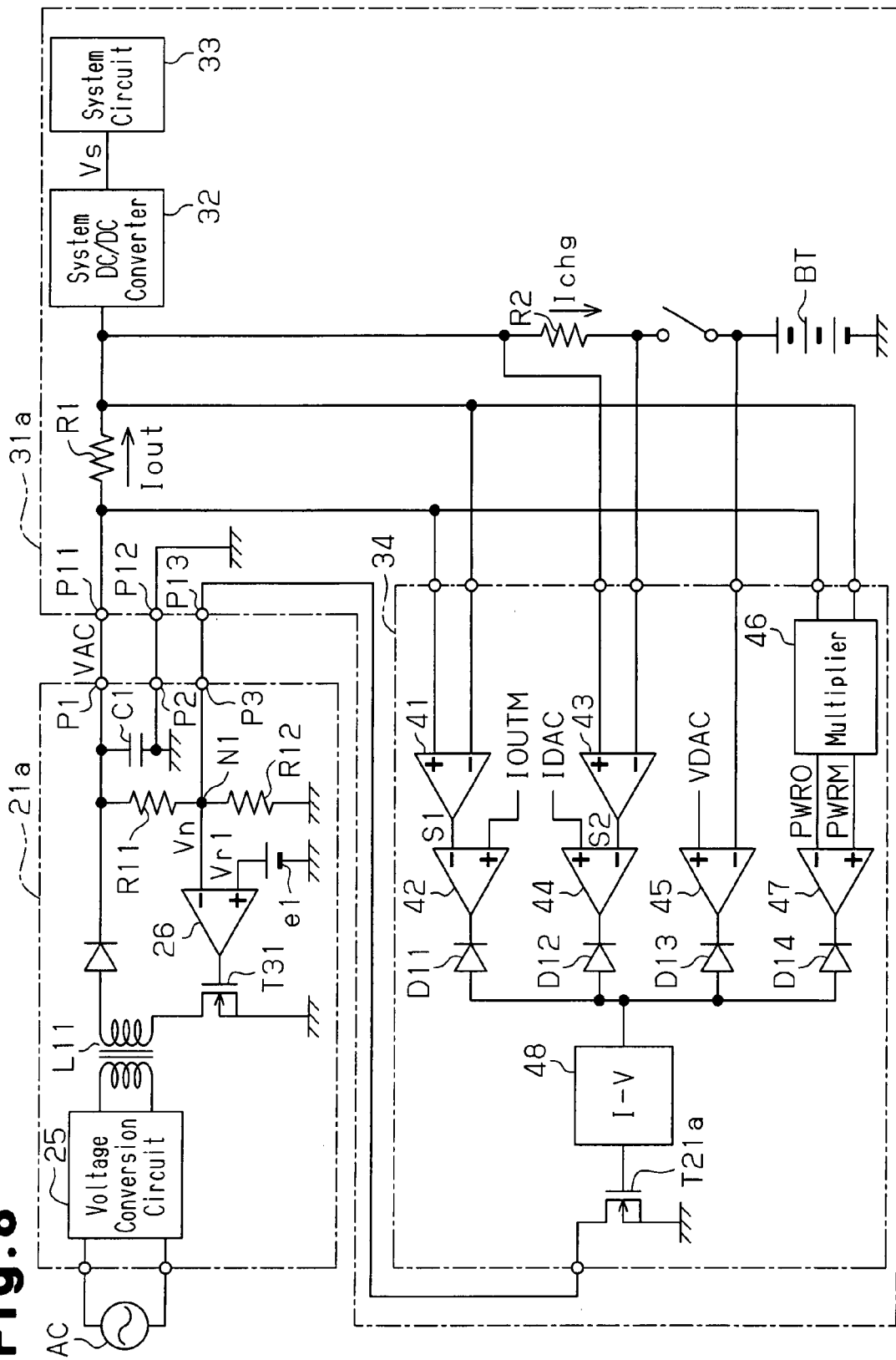
FIG. 8 is a block diagram of a power supply system according to another embodiment.

In this embodiment, the battery detection circuit 34 of the electronic device 31 supplies the control current Isc, and the voltage control circuit 23 of the AC adapter 21 maintains the adapter voltage VAC at a minimum voltage when the control current Isc is zero. Alternatively, the battery detection circuit may receive the control current Isc from the AC adapter. For example, FIG. 8 shows a power supply system according to another embodiment. In this power supply system, a battery detection circuit 34 of an electronic device 31a has a transistor T21a connected between a third terminal P13 of the electronic device 31a and ground. The gate of the transistor T21a is connected to a current voltage conversion circuit 48. The transistor T21a is an N-channel MOS transistor and has a source connected to ground and a drain connected to the third terminal P13 of the electronic device 31a. Accordingly, the battery detection circuit 34 receives a small amount of current from the AC adapter when error at its detection subject is large and receives a large amount of current from the AC adapter when the error is small.

The AC adapter may be operated to maintain the adapter voltage VAC at a minimum voltage when the control current Isc is zero and increase the adapter voltage VAC in proportion to the control current Isc when the control current Isc increases. One example of such operation of the AC adapter will now be described.

In lieu of the voltage conversion circuit 22 and the voltage control circuit 23 shown in FIG. 4, an AC adapter 21a shown FIG. 8 includes a voltage conversion circuit 25, a comparator 26, a transformer L11, a transistor T31, a reference power supply e1, resistors R11 and R12, and a capacitor C1. An input terminal of the voltage conversion circuit 25 is connected to an alternating-current power supply AC, and an output terminal of the voltage conversion circuit 25 is connected to an input side coil of the transformer L11. The voltage conversion circuit 25 voltage-converts a commercial alternating-current voltage supplied from an alternating-current power supply AC at the input side coil of the transformer L11 to generate a predetermined alternating-current voltage.

A first terminal of an output side coil of the transformer L11 is connected to an output terminal P1 of the AC adapter 21a, and a second terminal of the output side coil is connected to the transistor T31. The transistor T31, which is an N-channel MOS transistor, has a source connected to ground, a drain connected to the transformer L11, and a gate connected to an output terminal of the comparator 26.

A first terminal of the capacitor C1 is connected to the output terminal P1 of the AC adapter 21a, and a second terminal of the capacitor C1 is connected to a ground. The ground is connected to a ground terminal P2 of the AC adapter 21a. Further, a first terminal of the resistor R11 is connected to the output terminal P1 of the AC adapter 21a, and a second terminal of the resistor R11 is connected to a first terminal of the resistor R12. A second terminal of the resistor R12 is connected to ground. A node N1 between the resistors R11 and R12 is connected to an inversion input terminal of the comparator 26. The reference power supply e1 is connected to a non-inversion input terminal of the comparator 26. The inversion input terminal of the comparator 26, that is, the node N1, is connected to a control terminal P3 of the AC adapter 21a.

The AC adapter 21a outputs an adapter voltage VAC from its output terminal P1. The output terminal P1 is connected to the ground via the resistors R11 and R12. Thus, the voltage at the node N1 is a partial voltage Vn obtained by dividing the adapter voltage VAC by the resistance of the resistors R11 and R12. The node N1 is connected to the control terminal P3 of the AC adapter 21a. Thus, the node N1 receives the control current Isc. The amount of current flowing through the resistor R12 changes in accordance with the control current Isc. Thus, the partial voltage Vn at the node N1 also changes in accordance with the control current Isc. For example, when the control current Isc flowing from the node N1 to the control terminal P3 decreases, the amount of current flowing through the resistor R12 increases, and the partial voltage Vn at the node N1 increases by a voltage determined in accordance with the control current Isc. When the control current Isc flowing from the node N1 to the control terminal P3 increases, the amount of current flowing through the resistor R12 decreases, and the partial voltage Vn at the node N1 decreases by a voltage determined in accordance with the control current Isc.

The comparator 26 compares the partial voltage Vn at the node N1 with a reference voltage Vr1 supplied from the reference power supply e1 to control the transistor T31 in accordance with the comparison result. The comparator 26 provides an L (low) level signal to the gate of the transistor T31 when the partial voltage Vn is higher than the reference voltage Vr1 and provides an H (high) level signal to the gate of the transistor T31 when the partial voltage Vn is lower than the reference voltage Vr1. The transistor T31 is inactivated in response to an L level signal and activated in response to an H level signal. When the transistor T31 is activated, an alternating current flows through the output side coil of the transistor T11, and the alternating current is smoothed by the capacitor C1 to generate the adapter VAC. When the partial voltage Vn obtained by dividing the adapter voltage VAC is higher than the reference voltage Vr1, the transistor T31 is inactivated. When the partial voltage Vn is lower than the reference voltage Vr1, the transistor T31 is activated. In this manner, the comparator 26 activates and inactivates the transistor T31 in a manner that the partial voltage Vn at the node N1 coincides with the reference voltage Vr1.

The partial voltage Vn at the node N1 is varied by the control current Isc. When the control current Isc flows from the node N1 to the control terminal P3, the current flowing through the resistor R12 decreases and the partial voltage Vn at the node N1 decreases. In this case, the comparator 26 controls the transistor T31 so that the partial voltage Vn at the node N1 coincides with the reference voltage Vr1. As a result, the adapter voltage VAC increases. Accordingly, when the control current Isc does not flow, the AC adapter 21a maintains the adapter voltage VAC at the minimum voltage.

In this embodiment, the battery detection circuit 34 shown in FIG. 5 detects the voltage (output voltage) at the output side terminal of the resistor R1. However, such detection may be eliminated. More specifically, the multiplier 46, the error amplifier 47, and the diode D14 may be eliminated from the battery detection circuit.

Figure 9A:
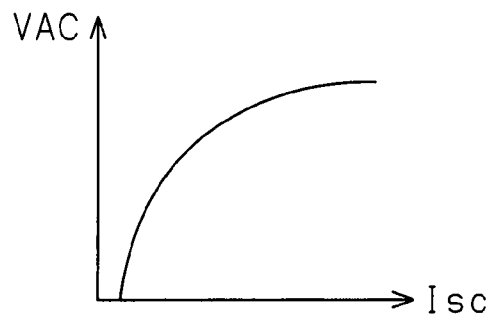
FIGS. 9A to 9E are graphs showing further relationships between a control current and an adapter voltage.
Figure 9D:
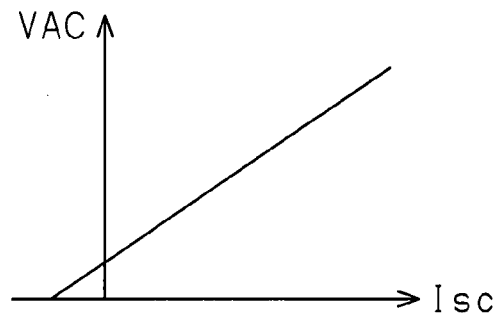
Figure 9B:
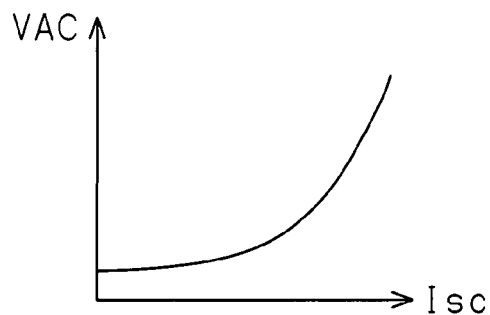
Figure 9E:
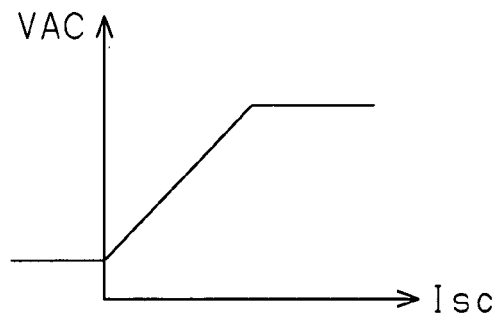
Figure 9C:
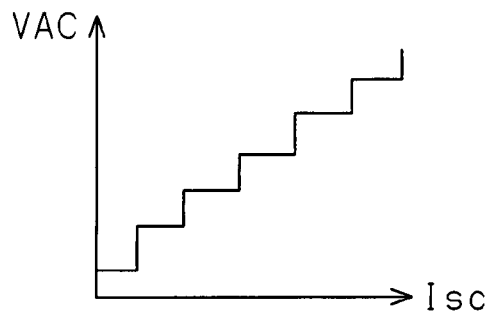

In this embodiment, the adapter voltage VAC is controlled in proportion to the control current Isc. However, the relationship between the control current Isc and the adapter voltage VAC may be changed as required. For example, the increasing amount of the adapter voltage VAC may be gradually decreased as the control current Isc increases, as shown in FIG. 9A. Alternatively, the increasing amount of the adapter voltage VAC may be gradually increased as the control current Isc increases, as shown in FIG. 9B. Alternatively, the adapter voltage VAC may increase in steps as the control current Isc increases as shown in FIG. 9C. Further, the minimum voltage of the adapter voltage VAC may be zero as shown in FIG. 9D. Moreover, a negative control current Isc may be supplied. Alternatively, a fixed adapter voltage VAC may be generated when the control voltage Isc is greater than or equal to a predetermined value as shown in FIG. 9E, or a fixed adapter voltage VAC may be generated when the control current Isc is less than or equal to a predetermined value.

Figure 10:
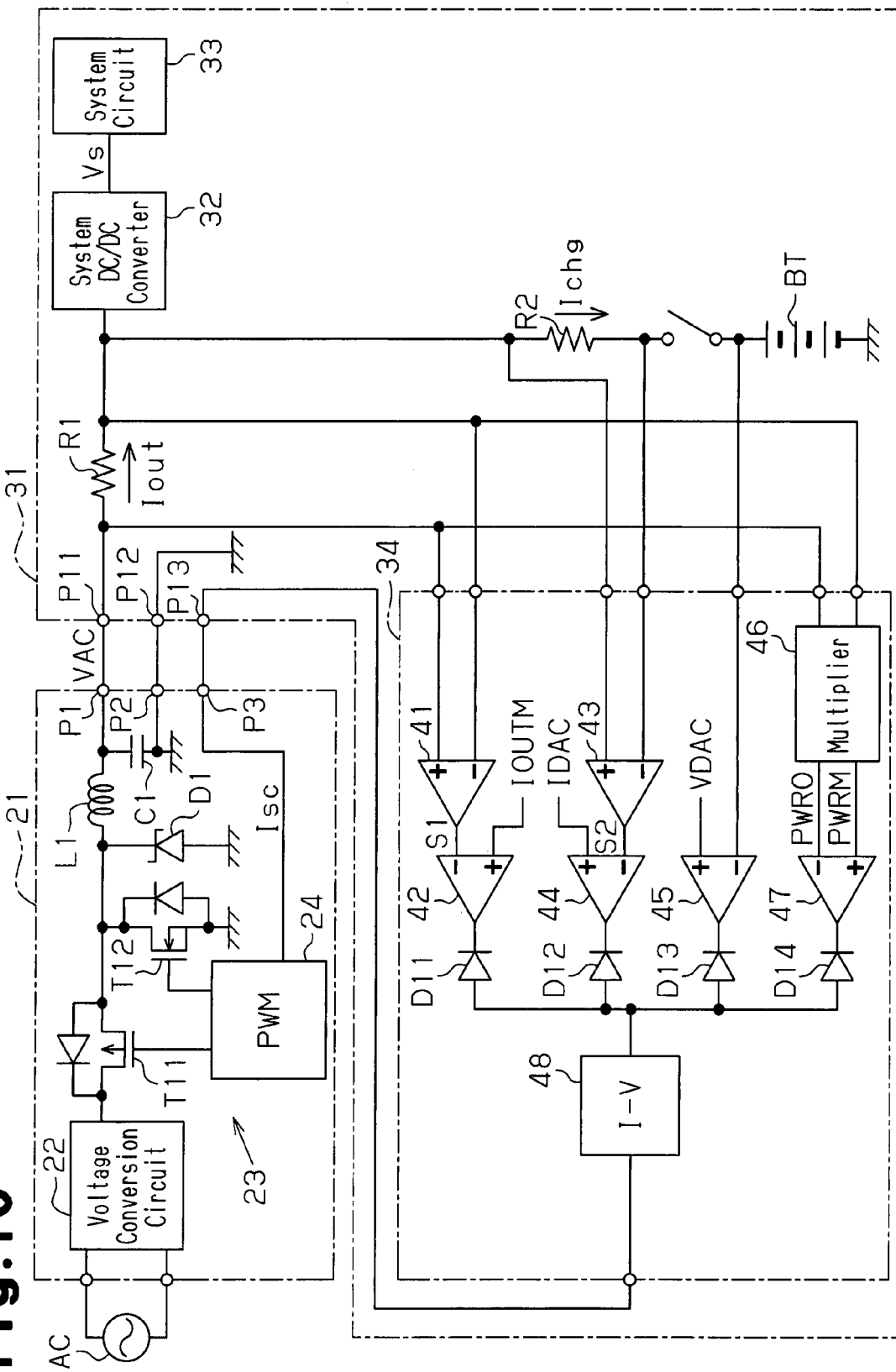
FIG. 10 is a block diagram of a power supply system according to another embodiment.

Although the control current is used as the control signal in this embodiment, the output signal of the current voltage conversion circuit 48 may be supplied to the AC adapter 21 as the control signal as in a power supply system according to another embodiment shown in FIG. 10.

The AC adapters 21 and 21a and the electronic devices 31 and 31a in these embodiments may be combined in an appropriate manner. The circuit configuration of the power supply system of the embodiment should not be limited to the AC adapters and the electronic devices of these embodiments.

It should be apparent to those skilled in the art that the embodiment may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

Figure 1:
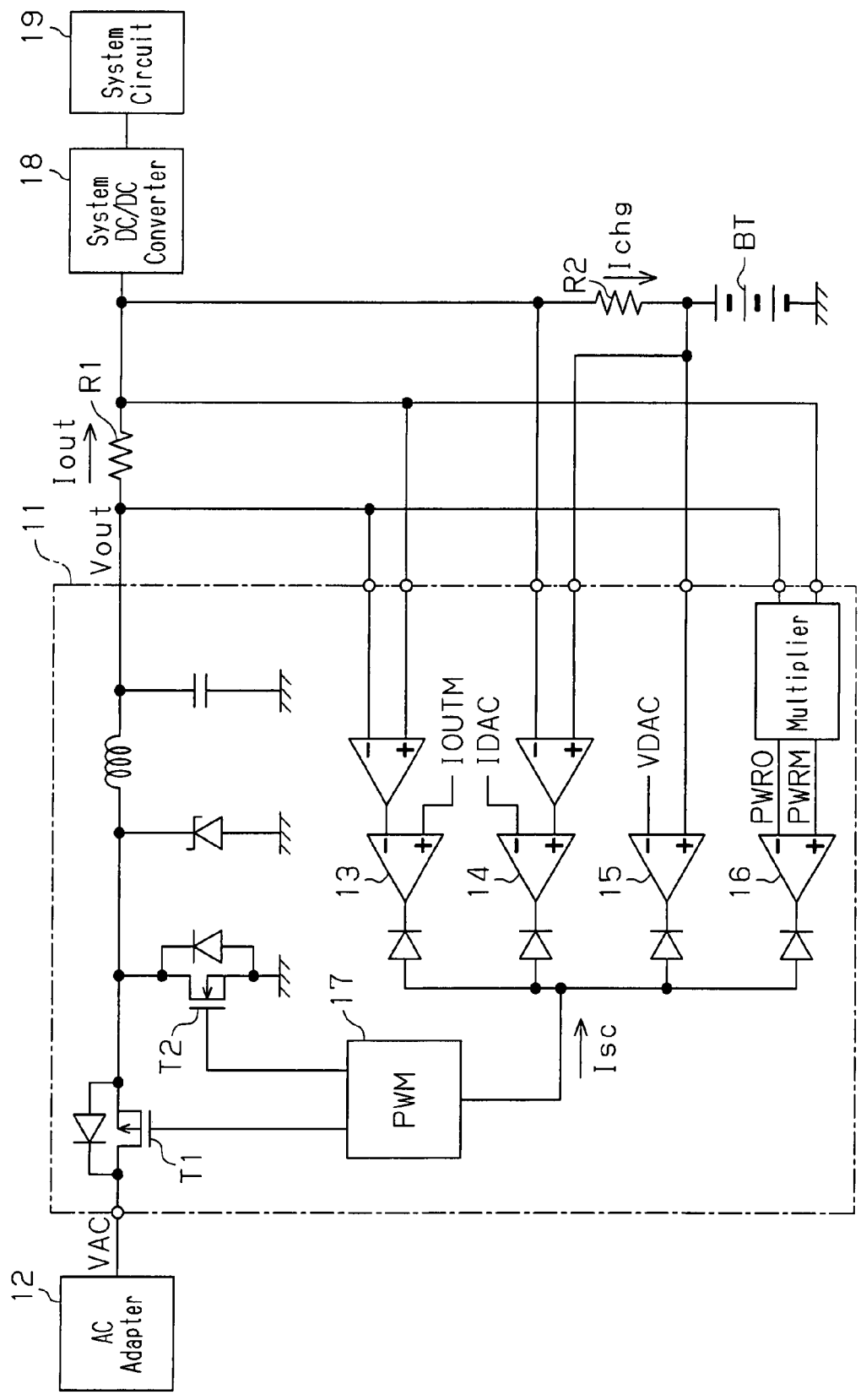
FIG. 1 is a circuit diagram of a conventional power supply system.
Figure 2:
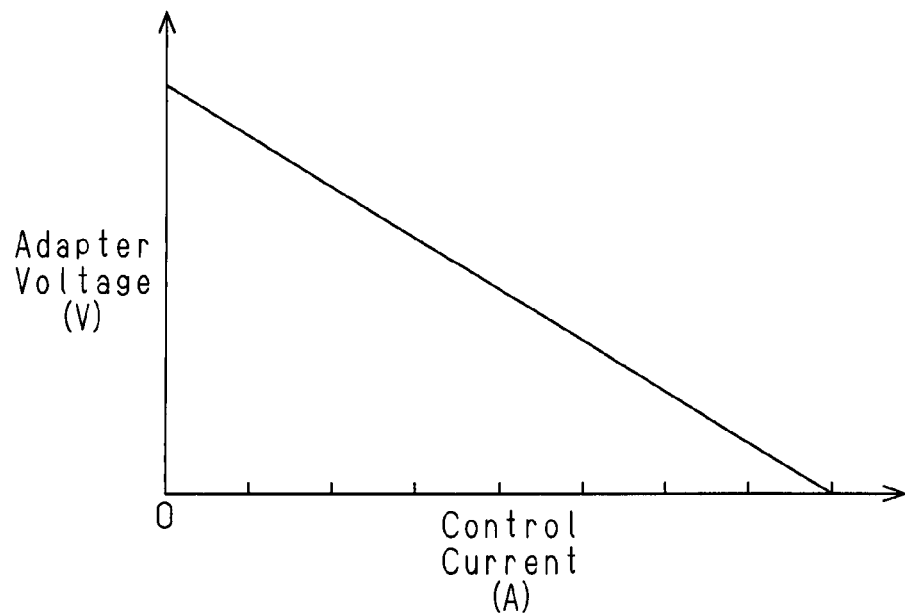
FIG. 2 is a characteristic diagram of a control current and an adapter voltage in the conventional power supply system.

There is a need for controlling the output voltage of an AC adapter. The conventional charging circuit 11 controls its output power by executing feedback loop control that varies the duty cycle for activating and inactivating the transistors with the control current Isc, which is generated in accordance with the output power of the charging circuit 11. However, as shown in FIG. 2, the conventional charging circuit 11 generates a lower output voltage Vout as the control current Isc increases. Thus, when the PWM 17 and the MOS transistors T1 and T2 incorporated in an electronic device are just incorporated in an AC adapter, the AC adapter will have problems (i) to (iii) as described below.

Figure 3:
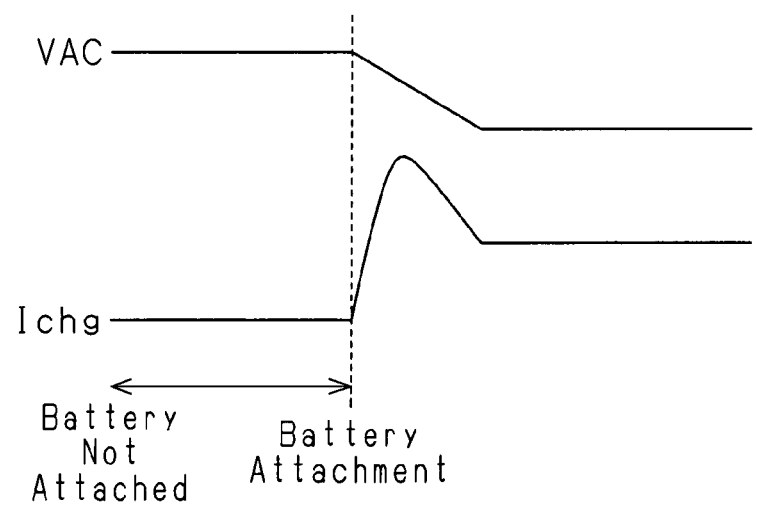
FIG. 3 is an operation waveform diagram of the conventional power supply system.

(i) When the battery BT is not attached to the electronic device, the charging current Ichg for charging the battery BT is zero as shown in FIG. 3. Thus, the control current Isc is decreased by an amount corresponding to an output current of the error amplifier 14, which detects the charging current Ichg, and the charging circuit 11 outputs a maximum output voltage Vout. When the battery BT is attached to the electronic device, voltage that is higher than the output voltage of the battery BT is output from the charging circuit 11 such that the charging current Ichg suddenly increases. As a result, the battery BT is supplied with inrush current excessive of a tolerable current of the battery BT. Such excessive inrush current causes the battery BT to deteriorate.

(ii) When an external power supply unit, which is in a state connected to an alternating-current power supply, is connected to the electronic device to which the battery BT is attached, the control current Isc is zero at the time of connection. Thus, the charging circuit 11 outputs the maximum voltage, and a large inrush current is supplied to the battery BT.

(iii) When the operating power supply voltage decreases, the output voltage of the charging circuit 11 decreases accordingly. Thus, a large control current Isc must flow through the charging circuit 11 that operates on the low operating power supply voltage. In this case, the charging circuit 11 operates with no margin for its operational power supply voltage, and the charging circuit 11 thereby operates under a harsh operating conditions.

The embodiment provides a power supply system and a control method for controlling output voltage of an external power supply unit to suppress inrush current.

One aspect of the embodiment is a power supply system including an external power supply unit for generating direct-current output voltage. An electronic device connected to the external power supply unit is operable on the output voltage of the external power supply unit. The external power supply unit includes a voltage control circuit for receiving control current and controlling the output voltage of the external power supply unit in accordance with the control current. The electronic device includes a rechargeable battery for generating battery voltage. A system circuit operates on system voltage generated from at least either one of the output voltage of the external power supply unit and the battery voltage of the rechargeable battery. A detection circuit detects the difference between a detection subject, which includes at least one of the battery voltage of the rechargeable battery, an output current of the external power supply unit, and a charging current for charging the rechargeable battery, and a reference signal, which is in accordance with the detection subject. The detection circuit generates the control current in accordance with the detected difference. The voltage control circuit controls the output voltage of the external power supply unit to be equal to the minimum voltage possible for the external power supply unit to generate when the control current is minimum.

Other aspects and advantages of the embodiment will become apparent from the following description, taken in conjunction with the accompanying drawings, illustrating by way of example the principles of the embodiment.

What is claimed is:

1. A power supply system comprising:
   an external power supply unit generating direct-current output voltage; and
   an electronic device coupled to the external power supply unit and operable on the output voltage of the external power supply unit;
   the external power supply unit including a voltage control circuit receiving control current and controlling the output voltage of the external power supply unit in accordance with the control current;
   the electronic device including:
      a rechargeable battery generating battery voltage;
      a system circuit that operates on system voltage generated from at least either one of the output voltage of the external power supply unit and the battery voltage of the rechargeable battery; and
      a detection circuit detecting the difference between a detection subject, which includes at least one of the battery voltage of the rechargeable battery, an output current of the external power supply unit, and a charging current charging the rechargeable battery, and a reference signal, which is in accordance with the detection subject, and generating the control current in accordance with the detected difference; and
   wherein the voltage control circuit controls the output voltage of the external power supply unit to be equal to the minimum voltage possible for the external power supply unit to generate when the control current is minimum.

2. The power supply system according to claim 1, wherein the detection subject of the detection circuit further includes output power of the external power supply unit.

3. The power supply system according to claim 1, wherein the detection circuit includes:
   an amplifier generating error current in accordance with the difference between the detection subject and the reference signal;
   a current voltage conversion circuit converting the error current received from the amplifier into a voltage signal; and
   a metal oxide semiconductor transistor coupled to the current voltage conversion circuit and having a control terminal receiving the voltage signal output from the current voltage conversion circuit, a first terminal receiving the output voltage of the external power supply unit, and a second terminal connected to the external power supply unit;
   wherein the metal oxide semiconductor transistor outputs the control current in accordance with voltage of the voltage signal, and the voltage control circuit controls the output voltage of the external power supply unit in accordance with the control current received from the metal oxide semiconductor transistor.

4. The power supply system according to claim 1, wherein the detection circuit includes:
   an amplifier generating error current in accordance with the difference between the detection subject and the reference signal;
   a current voltage conversion circuit converting the error current received from the amplifier into a voltage signal; and
   a metal oxide semiconductor transistor coupled to the current voltage conversion circuit and having a control terminal receiving the voltage signal output from the current voltage conversion circuit, a first terminal coupled to ground, and a second terminal connected to the external power supply unit; and wherein the control current flows toward the metal oxide semiconductor transistor in accordance with voltage of the voltage signal, and the voltage control circuit controls the output voltage of the external power supply unit in accordance with the control current.

5. A method for controlling direct-current output voltage generated by an external power supply unit in accordance with control current generated by an electronic device, the method comprising:

generating the control current in accordance with the difference between a detection subject, which includes at least one of battery voltage of a rechargeable battery included in the electronic device, an output current of the external power supply unit, and a charging current charging the rechargeable battery, and a reference signal, which is in accordance with the detection subject, with the electronic device;

supplying the control current from the electronic device to the external power supply unit; and controlling the output voltage of the external power supply unit in accordance with the control current, said controlling including controlling the output voltage to be equal to the minimum voltage possible for the external power supply unit to generate when the control current is minimum.

6. The method according to claim 5, wherein the detection subject of the detection circuit further includes output power of the external power supply unit.

7. The method according to claim 5, wherein the electronic device has a detection circuit including:

an amplifier generating error current in accordance with the difference between the detection subject and the reference signal;

a current voltage conversion circuit converting the error current received from the amplifier into a voltage signal; and a metal oxide semiconductor transistor coupled to the current voltage conversion circuit and having a control terminal receiving the voltage signal output from the current voltage conversion circuit, a first terminal receiving the output voltage of the external power supply unit, and a second terminal coupled to the external power supply unit;

wherein the metal oxide semiconductor transistor outputs the control current in accordance with voltage of the voltage signal, and the voltage control circuit controls the output voltage of the external power supply unit in accordance with the control current received from the metal oxide semiconductor transistor.

8. The method according to claim 5, wherein the electronic device has a detection circuit including:

an amplifier generating error current in accordance with the difference between the detection subject and the reference signal;

a current voltage conversion circuit converting the error current received from the amplifier into a voltage signal; and a metal oxide semiconductor transistor coupled to the current voltage conversion circuit and having a control terminal receiving the voltage signal output from the current voltage conversion circuit, a first terminal connected to ground, and a second terminal coupled to the external power supply unit; and wherein the control current flows toward the metal oxide semiconductor transistor in accordance with voltage of the voltage signal, and the voltage control circuit controls the output voltage of the external power supply unit in accordance with the control current.

9. A power supply system comprising:

an external power supply unit converting an alternating-current voltage to a direct-current voltage and outputting the direct-current output voltage from an output terminal; and an electronic device including a first terminal receiving the output voltage from the output terminal of the external power supply unit and operable on the output voltage of the external power supply unit, the electronic device generating a control current;

the external power supply unit including a control terminal receiving the control current and a voltage control circuit controlling the output voltage of the external power supply unit as a function of the control current;

the electronic device including:

a rechargeable battery generating battery voltage;

a system circuit that operates on system voltage generated from at least either one of the output voltage of the external power supply unit and the battery voltage of the rechargeable battery; and a detection circuit detecting the difference between a detection subject, which includes at least one of the battery voltage of the rechargeable battery, an output current of the external power supply unit, and a charging current charging the rechargeable battery, and a reference signal, which is in accordance with the detection subject, and generating the control current in accordance with the detected difference; and wherein the voltage control circuit controls the output voltage of the external power supply unit to be equal to the minimum voltage possible the external power supply unit to generate when the control current is minimum.

10. The power supply system according to claim 9, wherein said function is determined such that the output voltage proportionally increases as the control current increases.

11. The power supply system according to claim 9, wherein said function is determined such that the increasing amount of the output voltage gradually decreases as the control current increases.

12. The power supply system according to claim 9, wherein said function is determined such that the increasing amount of the output voltage gradually increases as the control current increases.

13. The power supply system according to claim 9, wherein said function is determined such that the output voltage increases in steps as the control current increases.

14. The power supply system according to claim 9, wherein said function is determined such that the output voltage is maintained at zero when the control current has a negative value.

15. The power supply system according to claim 9, wherein said function is determined such that the output voltage is maintained at a predetermined fixed positive value when the control current is greater than or equal to a predetermined value.

16. The power supply system according to claim 1, wherein the voltage control circuit controls to make the output voltage of the external power supply unit to decrease when the control current decreases.

* * * * *